C. E. BONINE.
ELECTRIC LIGHTING SYSTEM.
APPLICATION FILED NOV. 8, 1910.
1,023,121.
Patented Apr. 16, 1912.
4 SHEETS—SHEET 1.
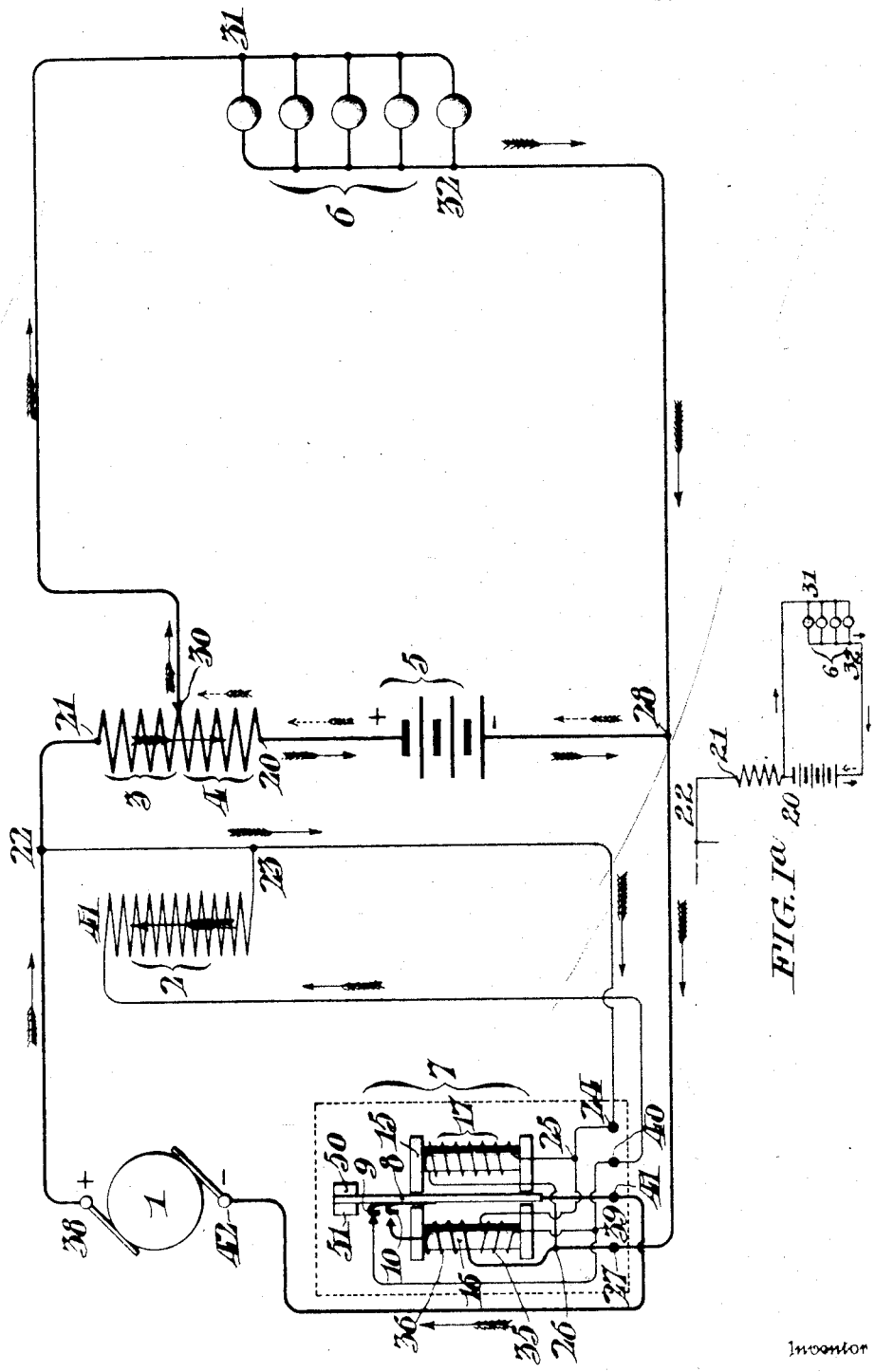
Inventor
Charles E. Bonine,
Witnesses
Attorneys C. E. BONINE.
ELECTRIC LIGHTING SYSTEM.
APPLICATION FILED NOV. 8, 1910.
1,023,121.
Patented Apr. 16, 1912.
4 SHEETS—SHEET 2.
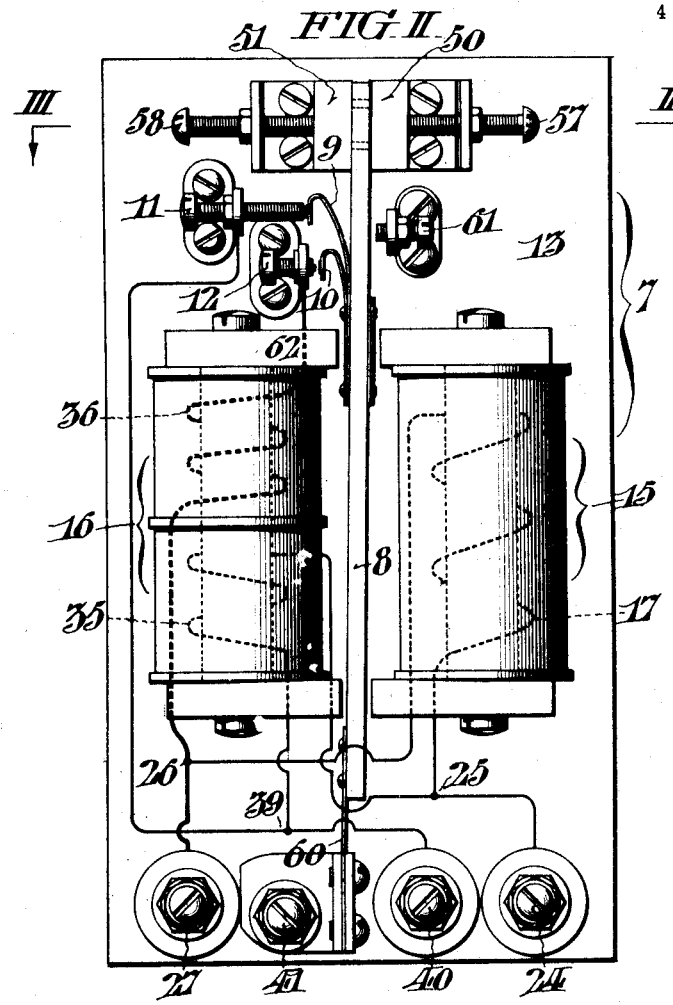
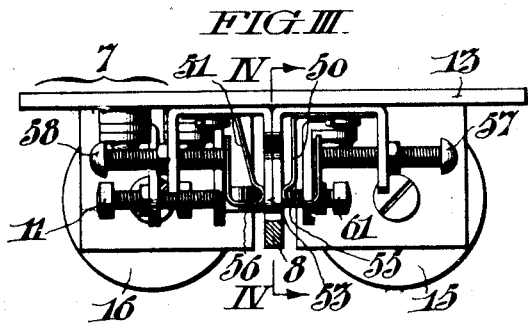
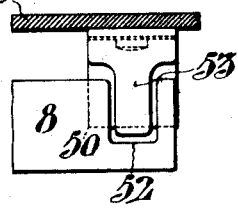
Inventor
Charles E. Bonine,
Witnesses
John C. Bergner
James H. Bell.
Attorneys

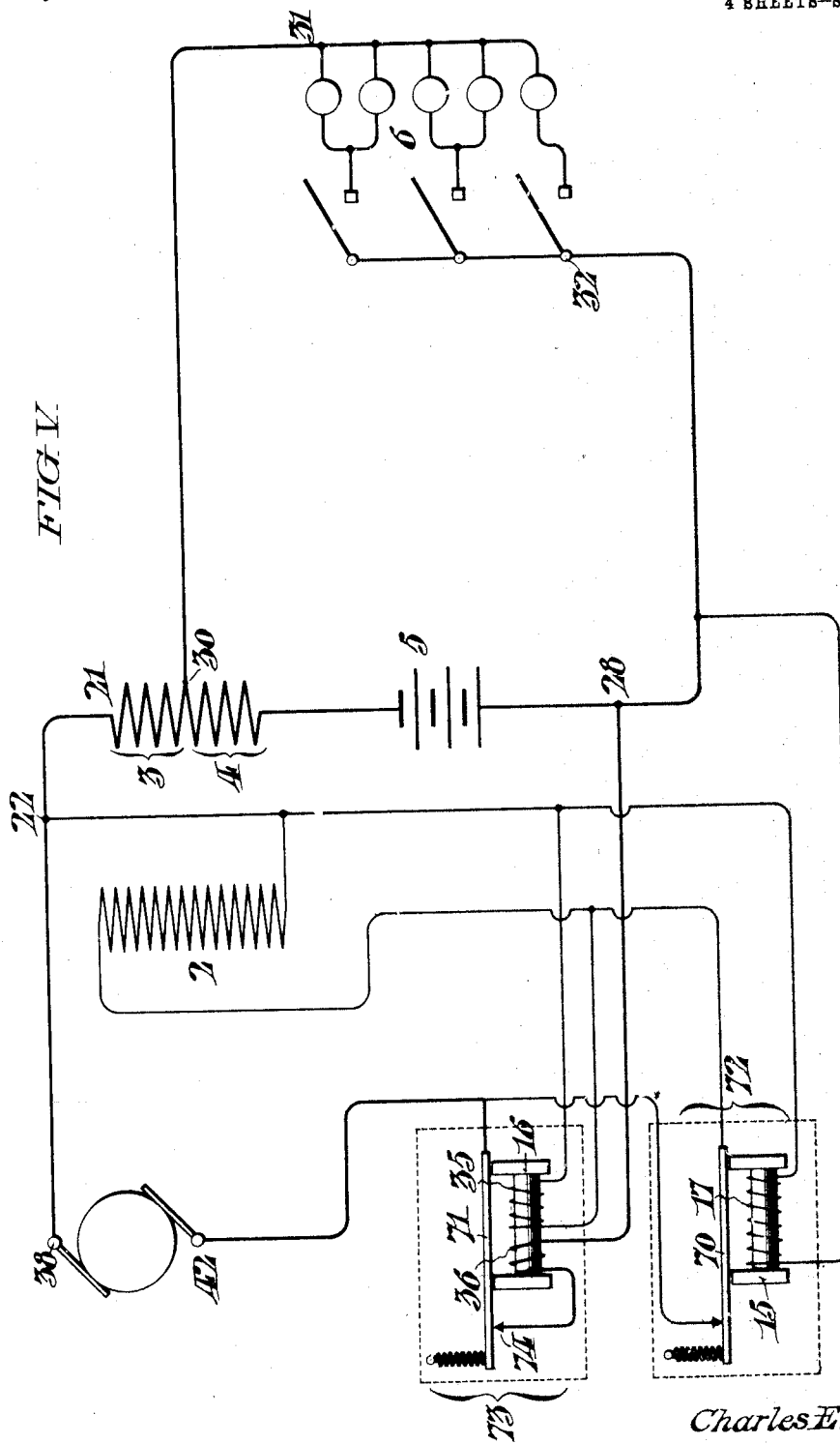

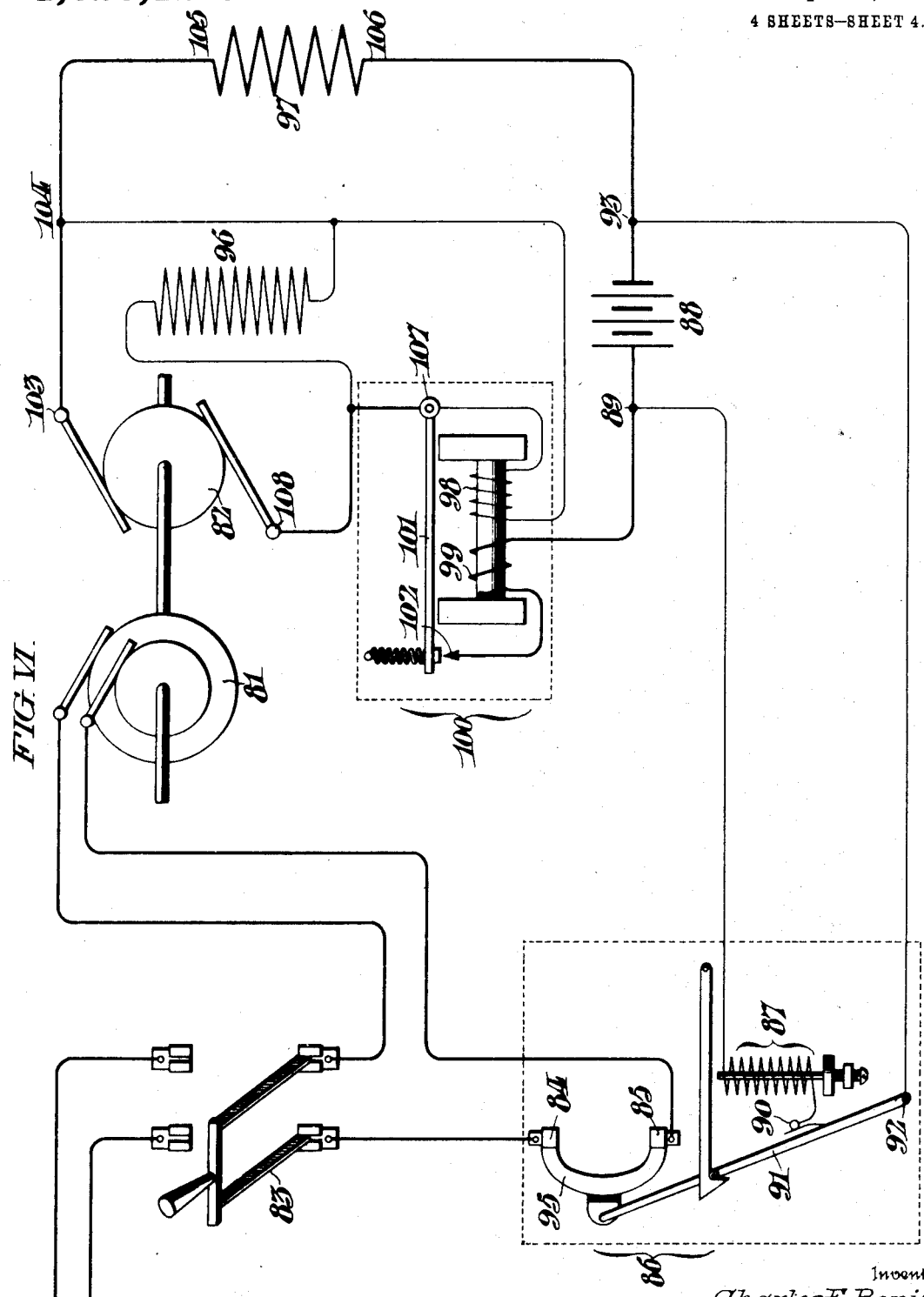

UNITED STATES PATENT OFFICE.

CHARLES E. BONINE, OF PHILADELPHIA, PENNSYLVANIA.

ELECTRIC-LIGHTING SYSTEM.

1,023,121.  Specification of Letters Patent.  Patented Apr. 16, 1912.

Application filed November 8, 1910.  Serial No. 591,296.

*To all whom it may concern:*

Be it known that I, CHARLES E. BONINE, of Philadelphia, in the county of Philadelphia and State of Pennsylvania, have invented certain new and useful Improvements in Electric-Lighting Systems, whereof the following is a specification, reference being had to the accompanying drawings.

My invention relates to a system of electric light heat or power supply in which a storage or secondary battery is used together with a suitable generator for charging the battery, and provides means for automatically connecting the generator to the battery, means for automatically limiting the maximum value of the charging current flowing from the generator to the battery, and means for automatically disconnecting the charging generator from the battery when the charge in the battery has reached the desired amount.

Systems using the above combination of battery, generator, and automatic devices are applicable to electric lighting for automobiles, of the gasolene or steam driven type, electric lighting for steam railroad cars, electric light and power from windmill driven generators, and for charging storage batteries automatically from generators driven by any source of power. Any or all of the above being economically accomplished by variations in the details of construction and the electrical connection of the automatic devices.

An object of the invention is to provide an automatic switch or relay for a system of the above character which is located in the main or series circuit, which switch is controlled by the voltage of the storage battery, whereby when said voltage reaches a predetermined low point, and the generator voltage reaches the proper point then said switch will be closed.

A further object of the invention is to provide an automatic switch for the shunt field circuit of the generator, which switch is automatically controlled by the voltage of the storage battery, so that when said voltage reaches a predetermined low point, said switch will be closed.

A further object of the invention is to provide operating windings for automatic switches of the above character, which will so control said switches that the switch governing the shunt field will be closed first, and subsequently the switch governing the series circuit.

A further object of the invention is to provide a system for electric lighting including a generator having shunt and series fields, together with a storage battery and a series of lights wherein the connection between the series of lights is so disposed relative to the series windings of the generator that the battery will be charged at a lower speed of the generator, when said battery is connected to the lights.

These and other objects will in part be obvious, and will in part be hereinafter more fully described.

Figure I, is a diagrammatic view showing my improved system as applied to electric lighting for an automobile. Fig. I$^a$ is a diagrammatic view showing a connection wherein the load is directly connected to the battery. Fig. II, is a detail of the relay or automatic device for making the necessary electrical connections at the proper times. Fig. III, is a sectional view through the relay adjusting springs, taken on the line III, III, in Fig. II. Fig. IV, is a partial section showing the construction of the spring stop and armature to operate freely over the stop, and is indicated at IV, IV, in Fig. III. Fig. V, is a diagrammatic view showing a slight modification of the invention in that the armature for controlling the switches is made in two parts instead of one. Fig. VI, is a diagrammatic view showing a further modification of my invention in that the automatic cut out controlled by the battery is located in the line operating a motor which in turn operates the generator.

The generator armature 1, is driven in any convenient manner from the engine shaft, fan shaft, or any other suitable rotating member, preferably forward of the clutch and transmission of an automobile. The generator is provided with shunt field windings 2, and series field windings 3, and 4, these latter being connected in opposition to the shunt field windings. The storage battery 5, receives its charge during the operation of the generator and furnishes energy to the lamps or load 6, when the generator is not running. My improved relay or switch 7, performs the function of making and breaking the generator connections to the battery at the proper time.

This switch 7, consists of a single armature 8, carrying two independent contact springs 9, and 10, in alinement with two corresponding independently adjustable contact screws 11, and 12, mounted on the insulated base 13, of the relay or switch 7. The spring 9, and screw 11, form contact points for controlling the shunt field circuit and the spring 10, and screw 12, form contact points for controlling the series circuit.

The armature 8, is acted on by the two magnets 15, 16, placed one on each side. Magnet 15, is wound with a high resistance coil 17, which coil is connected across the battery terminals through the circuit 20, 21, 22, 23, 24, 25, 26, 27, 28, and the strength of the magnet 15, will vary with the voltage of the battery 5, and the resistance drop in the portion of the generator series field coil 4, when energy is being drawn from the battery through the load circuit 20, 30, 31, 32, 28.

The magnet 16, is wound with two coils 35, and 36. The coil 35, is of high resistance and is connected across the generator armature through the circuit 38, 22, 23, 24, 25, 39, contacts 9, and 11, relay armature 8, 41, and 42, and the current flowing in this circuit will vary approximately with the voltage of the generator armature 1. The coil 36, consists of a few turns of comparatively large size wire, and the main current from the generator to the battery flows through it in the circuit 38, 21, 20, 28, 27, 26, contact 10, relay armature 8, 41, and 42. The coils 35, and 36, are wound in such direction that their magnetizing actions on the magnet 16, are added together when current flows from the generator to the battery, but when current flows from the battery to the generator the magnetizing action of the coil 36, is in opposition to that of the coils 35. Springs 50, and 51, press upon opposite sides of the relay armature 8, and as shown in Figs. II, III, and IV, are independently adjustable. In Fig. IV, the end of the armature 8, is shown cut away at 52, to allow the armature to swing freely over a stationary spring stop 53. This stop 53, is approximately of the same thickness as the armature and the rounded portion 55, and 56, of the springs 50, and 51, shown in Fig. III, rest against the stop 53, and are of sufficient width to also rest against the armature on both sides of the cut away portion 52.

It will be seen that when the armature moves to the right in Fig. III, that the portion of the armature on each side of the cut away portion 52, will engage the spring 50, and that the spring 51, will remain resting on the stop 53, and hence the spring 51, will have no effect on the armature. The motion of the armature to the left, will engage the spring 51, and the spring 50, will remain against the stop 53, and have no effect. Adjustment of the strength of the springs 50, and 51, can therefore, be made independently of each other by means of the screws 57, and 58, respectively. The armature 8, is mounted on a flexible metal strip 60, at the rear end, which acts as a frictionless pivot permitting the armature to be moved to the right toward the magnet 15, against the action of the spring 50, or to the left toward the magnet 16, against the action of the spring 51.

The motion of the armature toward the magnet 15, is limited by an adjustable stop 61, and contacts 9, and 11, will be separated when the armature is resting against the stop 61. When the armature stands clear of the stop 61, contacts 9, and 11, will be closed. When the armature 8, is drawn over to the left by the magnet 16, against the action of the spring 51, the contacts 9, and 11, remain closed, and contacts 10, and 12, will be closed near the end of the movement of the armature toward the pole pieces of magnet 16.

The non-magnetic spring contacts 9, and 10, are extended along the armature in such manner that the motion of the armature toward the magnet 16, is limited by their interposition between armature and pole face 62, of the magnet 16.

The adjustments of the relay or switch are made as follows:—The spring 50, of the relay or switch 7, is so adjusted that when the voltage of the battery 5, is above a certain value, representing full charge in the battery, the armature 8, will be drawn against the stop 61, and contacts 9, and 11, and also contacts 10, and 12, will be separated. The spring 51, of the relay or switch 7, is so adjusted that contacts 10, and 12, will be closed when the voltage of the generator armature 1, slightly exceeds the voltage of the battery when charging is desirable.

The operation of the system is as follows:—Considering that the battery 5, has lost some of its charge and that its voltage has reached a corresponding low point, the armature 8, of the relay 7, will be in the position shown in Fig. II, that is, away from the stop 61, and with the contacts 9, and 11, closed. Now on starting the engine the speed of the armature 1, increases and the current will flow through the shunt field 2, through the circuit 38, 22, 23, 41, 40, 39, contacts 9, and 11, and armature 8, and 41, 42, and at the same time the relay coil 35, will receive current through the circuit 38, 22, 23, 24, 25, 39, contacts 9, and 11, armature 8, and 41, 42. When the generator armature speed has increased to a point where the voltage generated exceeds a predetermined value, the armature 8, will be drawn over to close the contacts 10, and 12, which completes the battery charging circuit 38, 21, 20, 28, 27, 26, contacts 10, and 12, armature 8, and 41, 42. As the speed of the generator armature 1, further increases, the current in the charging circuit increases and the strength of the series fields 3, 4, also increases. These series fields are connected in opposition to the shunt field 2, and so proportioned in relation to the shunt field that the maximum current flowing through the charging circuit cannot exceed a predetermined maximum when the speed of the generator armature is increased to the highest possible by the driving engine.

In practice the field windings are so proportioned and the armature speed so arranged by gearing or other method of driving from the automobile engine that the battery will be charged at all speeds between a given minimum and the possible maximum by a current from the generator that cannot exceed the maximum charging rate of the battery. Furthermore, it will be seen that as the speed of the generator gradually increases from the minimum charging speed the charging current will increase at a more rapid rate than the speed but as the armature speed increases further toward its maximum the charging current increases at a slower rate than the speed of the generator. Again considering that the engine is slowed down below the speed for generating the minimum voltage, or is stopped, a current will flow from the battery through the circuit 20, 21, 38, 42, 41, 8, 10, 26, 27, 28, which it will be seen is in reverse directions to that in which the charging current flows. The effect will be to reverse the magnetizing action of the coil 36, of the relay 7, and as the coil 35, has been weakened through the lowering of the generator voltage, then a small reverse battery current through the coil 36, will serve to neutralize the effect of the coil 35, and the magnet 16, being weakened, the spring 51, will push the armature 8, away from its pole faces and the contacts 10, and 12, will be separated. The charging circuit is thereby opened. If at this time the battery 5, has been charged up to a desired maximum then the voltage of the battery has risen to a corresponding point and the strength of the coil 17, of the relay 7, will be increased to a point where the armature 8, will be drawn against the stop 61, and the contacts 9, and 11, will be separated. Now as the circuit of the shunt field of the generator and also the circuit of the coil 35, of the relay or switch 7, are both broken by the opening of the contacts 9, and 11, it will be seen that no matter at what speed the generator armature 1, be driven, the battery cannot receive any further charge. When again the battery charge is exhausted to a desired minimum for which adjustment of spring 50, of the relay 7, has been made, then the contacts 9, and 11, will be again established and charging of the battery can be accomplished as in the first instance. It will be seen by referring to Fig. I, that the magnetic circuit through armature 8 and magnet 16 will be practically closed when the generator is charging the battery, and the magnetic circuit through armature 8 and magnet 17 is at that time relatively poor. The result will be that the armature 8 will be held strongly by magnet 16, and magnet 17 will not be able to draw the armature away from magnet 16 and consequently cannot act to open the contacts 10—12 and 9—11 during charging. The series circuit can only be opened by the weakening of magnet 16, due to reduction of the generator voltage below that of the battery. When the series circuit is open, armature 8 lies closer to magnet 17, and if at this time the battery voltage is above a predetermined point, as provided for in adjustment of spring 50, then the armature will be drawn over against stop 61, and the shunt circuit will be interrupted. It will be seen that this shunt circuit cannot be opened until the generator voltage has fallen below that of the battery and after the series circuit has been opened. The shunt circuit is consequently opened when a relatively low voltage is being impressed on this circuit by the armature of the generator. Further, considering that the loads or lamps 6, are operating on the battery, then the current will flow through the circuit 20, 30, 31, 32, 28, and the series fields 4, will be seen to be carrying current in the direction to assist the shunt field. The field of the generator being thereby strengthened, the speed at which charging can begin will be lower than when no current is being drawn from the battery. This feature is desirable on an automobile when at night all the lights are burning and the average speed of running is below that of daylight operation, or when no lights are burning. In this case the generator will be run at a comparatively low average speed and the battery will be discharging at a high rate.

It will be seen that various arrangements of the ratio of ampere turns in series field 3, to those in series field 4, can be made, and the relative number of series and shunt ampere turns can be varied to suit various desired conditions of loads and speeds and charging rates of the battery.

The load can be connected in a circuit 20, 31, 32, 28, as shown in Fig. I$^a$, when it is desirable that the voltage in the lamps or other load 6 be held at a more steady value; also when the rate of charging the battery with the load turned on is to be maintained the same as with the load off. This latter method of connecting the lamps in an automobile lighting system will usually be preferred.

The relay just described requires the battery voltage to be below a predetermined value before charging can begin. When the generator is running above a certain speed and the battery voltage falls to the minimum at which the relay is set, then charging of the battery begins automatically and continues until the generator speed falls below a certain speed, when charging is discontinued. Should the battery voltage now be still below the minimum at which the relay is set, then charging will again begin when the generator speed rises above a certain point. However, cases may arise where the generator will run for long periods above a certain speed, and it may be possible to overcharge the battery, for such a case the relay should preferably be arranged as in Fig. V. The same principle applies as before, but now the armatures 70, 71, of relays 72, 73, are independent of each other, and 72, can be so adjusted that when the battery charging voltage reaches a predetermined maximum, the generator field circuit will be interrupted and relay 73, will drop its armature opening contacts 74, and disconnecting the battery charge. When, later on the battery voltage falls below a point for which the relay 72, is adjusted, the charging of the battery will begin in the same manner as before.

When it is desired to charge a storage battery, and when full charge is reached, it is desired to interrupt the charging circuit and also shut off power from the generator, the relays may be modified as shown in Fig. VI, which is a diagram of the arrangement for charging a battery from a motor driven generator with the relay 86, operating to open the motor supply circuit instead of opening the generator shunt field circuit as previously described. 81 is an alternating current motor driving the charging generator 82. The motor receives its supply from the mains through switch 83, and contacts 84, and 85, of the relay or switch 86. The coil 87, of the relay 86, is energized by current from the battery 88, through the circuit 89, 90, 91, 92, 93, and is adjusted to release the arm 91, when the voltage of the battery reaches the desired maximum, thereby opening the contact 84, and 85, and interrupting the current supply to the motor 81. The generator is provided with shunt field winding 96, and series field windings 97, the latter being connected in opposition to the shunt field windings. The relay or switch 100, is of the same general design as previously described being provided with two windings 98, and 99, and operating to close or open contacts 102, under the proper conditions. The battery 88, being connected at points 89, 93, the relay or switch 86, and switch 83, are closed and the motor started. As the generator increases in speed the voltage generated increases to the point where coil 98, of relay 100, operates on armature 101, to close the contacts 102, and complete the charging circuit 103, 104, 105, 106, 93, 89, 102, 101, 107, and 108. The maximum charging current is limited by the differential action of the series field 97, and shunt field 96. Charging will continue until the battery voltage reaches the maximum for which the relay 86, is set, and the contacts 84, 85, are thereby opened thus interrupting the power supply to the motor. The motor will stop as also the generator, and the relay 100, will operate as previously described, to open the contacts 102, and disconnect the charging circuit. A contact 90, 91, can be arranged on relay 86, to also interrupt the circuit in coil 87, if desired. It will be seen that if the current supply to the motor is interrupted beyond the switch 95, and again restored, that the battery charge will automatically continue on restoration of power supply to the motor until the charge in the battery reaches the desired value.

A valuable inherent feature of the system when applied to charging independent batteries, for instance ignition and lighting batteries which are taken off automobiles for charging purposes, is the following: The battery 88, can be connected to points 89, and 93, in Fig. VI, either with the positive terminal on 89, negative on 93, or reversed and in either case, charging of the battery will proceed in the proper direction. Consider that the battery be connected to the points 89, and 93, in reverse direction with reference to the generator. Now when the generator is started, the voltage will increase with the speed until the coil 98, on relay 100, attracts the armature 101, momentarily closes contacts 102. At that instant, a very heavy current will flow through the circuit 103, 104, 105, 106, 93, 89, 102, 101, 107, 108, due to the fact that the battery 88, and the armature 82, electromotive forces are applied in the same direction in this circuit. This momentary heavy rush of current will cause the series field 97, to overpower the shunt field 96, and hence reverse the effective resultant magnetic field of the generator. This field reversal will reverse the electromotive force of the armature 82, and consequently the coil 98, of the relay 100, will be reversed and the relay 100, will momentarily release its armature 101, and contacts 102, will be opened, thus breaking the charging circuit. It will be noted that the shunt field 96, and armature 82, have been reversed from their original condition, and they are now in the proper direction to charge the battery. The shunt field rapidly builds up and the coil 98, of the relay 100, attracts the armature 101, closing the contacts 102, and completing again the charging circuit, but this time in the direction, for properly charging the battery. I thus obtain the possibility of connecting the battery to the charging terminals and have the generator automatically reversed to suit the battery. In practice, it is found that the relay or switch closes momentarily, opens and closes again, the changes occurring in rapid succession.

It will be obvious that changes in the details of construction and arrangement of parts may be made without departing from the spirit of my invention as defined in the appended claims.

Having thus described my invention, I claim:—

1. The combination with a shunt and series wound generator and a secondary battery in the series circuit, of automatic means adapted to open the series and the shunt circuits when the battery voltage is at or above a predetermined point and the generator voltage is below said predetermined point.

2. The combination with a shunt and series wound generator and a secondary battery in the series circuit, of means for automatically closing the shunt circuit and the series circuit when the battery voltage is relatively low and the generator voltage is relatively high and for automatically opening the series circuit and then the shunt circuit when the battery voltage is relatively high and the generator voltage is relatively low.

3. The combination with a shunt and series wound generator, of a secondary battery in the series circuit, automatic means adapted to close and hold closed the shunt circuit and the series circuit, when the voltage of the battery is relatively low, and the voltage of the generator relatively high, and to open the series circuit when the generator voltage falls below that of the battery, and to open the shunt circuit when the voltage of the battery is relatively high and the series circuit is open.

4. The combination with a shunt and series wound generator, of a secondary battery in the series circuit, and an automatic switch including a single armature, contacts controlled by said armature, a winding connected across the terminals of the battery and adapted to operate upon said armature to separate the contacts when the battery voltage rises above a predetermined point and the generator voltage is below that of the battery, a winding connected across the armature of the generator and acting upon the armature of the switch to close the contacts when the battery voltage is relatively low, and a winding lying in the series circuit and operating upon said armature to aid in holding the series circuit closed when the generator is charging the battery, and to aid in opening the series circuit when the battery discharges through the generator.

5. The combination with a shunt and series wound generator and a secondary battery in the series circuit, of means for automatically closing the shunt circuit and the series circuit when the battery voltage is relatively low and the generator voltage is relatively high and for automatically opening the series circuit and then the shunt circuit when the battery voltage is relatively high and the generator voltage is relatively low, said means including a single armature, magnets on opposite sides of said armature, one of said magnets having a coil connected across the battery terminals, and the other magnet having a coil in the series circuit and another coil connected across the armature of the generator.

6. In a lighting system, the combination of a compound wound generator having the series field winding opposed to the shunt; a storage battery in the series circuit; an automatic switch in the series circuit; an automatic switch in the shunt field circuit, said switches including a single armature, two contact points carried thereby, spaced contact points coöperating with the contact points on the armature, and disposed so that the contact points for the shunt field circuit will close in advance of the contact points in the series circuit; a spring for normally holding separated the contact points in the series circuit; means for closing and holding closed said contact points including a winding lying in the series circuit; and a winding connected across the armature of the generator, said windings operating together for holding the contact points closed when charging the battery and being opposed to each other upon the discharge of current from the battery through the generator for releasing the contact points.

7. In a lighting system, the combination of a compound wound generator having the series field winding opposed to the shunt; a storage battery in the series circuit; an automatic switch in the series circuit; an automatic switch in the shunt field circuit, said switches including a single armature; two contact points carried thereby; spaced contact points coöperating with the contact points on the armature and disposed so that the contact points for the field circuit will close in advance of the contact points in the series circuit; a spring for normally holding said contact points for the series circuit separated; means for closing and holding closed said contact points including a winding lying in the series circuit, and a winding connecting across the armature of the generator, said windings operating together when charging the battery, and being opposed to each other upon the discharge of current from the battery through the generator; and means operating upon said armature and tending to separate said contact points, including a winding connected across the terminals of said battery.

8. In a lighting system, the combination of a compound wound generator, having the series field winding opposed to the shunt; a storage battery in the circuit; a series of lights connected to said battery, one of the terminals of said light circuit being connected intermediate to the ends of the series winding of the field whereby a portion of the discharge current from the battery to the light circuit, will be in the same direction as the current in the shunt field of the generator.

9. In a lighting system, the combination of a compound wound generator having the series field winding opposed to the shunt; a storage battery in the circuit; a series of lights connected to said battery, one of the terminals of said light circuit being connected intermediate the end of the series winding of the field whereby a portion of the discharge current from the battery to the light circuit will be in the same direction as the current in the shunt field of the generator, and an automatic switch located in the shunt field circuit of the generator; and means for governing said switch whereby when the battery reaches its maximum charge, said shunt field circuit will be broken and whereby when said battery reaches a minimum charge, said shunt field circuit will be reestablished.

10. In a lighting system, the combination of a compound wound generator having the series field winding opposed to the shunt; a storage battery in the circuit; a series of lights connected to said battery, one of the terminals of said light circuit being connected intermediate the ends of the series winding of the field whereby a portion of the discharge current from the battery to the light circuit will be in the same direction as the current in the shunt field of the generator, and an automatic switch including a relay shunt circuit, and means for governing said switch, whereby when the battery reaches its maximum charge, the relay circuit will be broken, and whereby when said battery reaches a minimum charge, said relay shunt circuit will be reestablished.

11. In a lighting system, the combination of a compound wound generator having the series field winding opposed to the shunt; a storage battery in the circuit; a series of lights connected to said battery, one of the terminals of said light circuit being connected intermediate the ends of the series winding of the field whereby a portion of the discharge current from the battery to the light circuit will be in the same direction as the current in the shunt field of the generator, and an automatic switch including a relay shunt circuit, said automatic switch being located in the shunt field circuit of the generator, and means for governing said switch whereby when the battery reaches its maximum charge, said shunt field circuit and relay shunt circuit will be broken, and whereby when said battery reaches a minimum charge, said shunt field circuit and said relay shunt circuit will be reestablished.

In testimony whereof, I have hereunto signed my name, at Philadelphia, Pennsylvania, this fifth day of November 1910.

CHARLES E. BONINE.

Witnesses:
JAMES H. BELL,
E. L. FULLERTON.